(12) United States Patent
Hettinga (10) Patent No.: US 6,217,973 B1
(45) Date of Patent: Apr. 17, 2001

(54) PLASTIC ARTICLE OF VARYING DENSITY

(76) Inventor: Siebolt Hettinga, 2123 NW. 111th St., Des Moines, IA (US) 50325-3788

( * ) Notice: Subject to any disclaimer, the term of this patent is extended or adjusted under 35 U.S.C. 154(b) by 0 days.

(21) Appl. No.: 09/368,059

(22) Filed: Aug. 3, 1999

Related U.S. Application Data

(62) Division of application No. 08/534,513, filed on Sep. 27, 1995, now Pat. No. 5,972,259.

(51) Int. Cl.$^7$ .................................................. B32B 3/00
(52) U.S. Cl. ....................... 428/71; 428/158; 428/167; 428/218; 428/310.5; 428/318.8
(58) Field of Search ............................. 428/68, 71, 126, 428/127, 172, 318.8, 158, 218, 310.5

(56) References Cited

U.S. PATENT DOCUMENTS

| | | | |
|---|---|---|---|
| 3,192,099 | * 6/1965 | Beckman et al. | 428/71 |
| 3,615,149 | * 10/1971 | Malone et al. | 264/295 |
| 3,647,590 | * 3/1972 | Wolf | 156/211 |
| 4,480,715 | * 11/1984 | Brooks | 428/71 |
| 4,686,130 | * 8/1987 | Kon | 428/71 |

* cited by examiner

*Primary Examiner*—Donald J. Loney
(74) *Attorney, Agent, or Firm*—Brian J. Laurenzo; Michael C. Gilchrist (57) ABSTRACT

A method for forming an angled plastic article of varying density whereby a blowing agent is added to a plastic material and the material is injected into a mold cavity of a mold unit. The interior walls of the mold cavity are maintained at a temperature sufficient to prevent the outer skin of the hardening plastic article from producing gas bubbles. The volume of the mold cavity is increased to allow bubbles to produce and uniformly distribute themselves throughout the mold cavity and then a reconversion phase is instituted whereby the desired density of the finished plastic article is achieved without voids or aberrations appearing in the surface of the plastic article. The mold unit is provided with extensible beveled edges which extend and retract as the mold cavity is enlarged and compressed. By this method, a resulting plastic article of varying density is produced having grooves running the length of the article. After the molding process is complete, an adhesive is applied to the grooves and the molded article is bent whereafter the adhesive maintains the article in the angled orientation. By this method, a complex structure having a smooth outer skin and a lightweight interior may be produced quickly and efficiently.

6 Claims, 5 Drawing Sheets

PLASTIC ARTICLE OF VARYING DENSITY

This application is a divisional of application Ser. No. 08/534,513, filed Sep. 27, 1995, now U.S. Pat. No. 5,972,259.

BACKGROUND OF THE INVENTION

This invention relates to a method for forming an angled plastic article of varying density and, more particularly, to a method for molding and bending a plastic article to form a smooth dense outer shell and a rare interior.

Injection molding machines generally include a two-section mold unit wherein one of the mold sections is stationary and includes an end gate opening for the injection of mold material into a mold cavity formed by the two mold sections. The other mold section is generally movable between an open position away from the stationary mold section and a closed position wherein the two mold sections are in sealed contact engagement to form the mold cavity. Once the mold cavity has been formed, a screw or similar injection device is used to inject a plastic material into the mold cavity where the material is cured under pressure. Injection molding provides an efficient means for producing plastic articles both quickly and economically.

It is often desired to create a plastic article of a decreased density which reduces the amount of material required to make the part and which significantly decreases the weight of the part. One way of creating a plastic part of reduced density is through the use of a blowing agent. Blowing agents are well-known in the art with most blowing agents being heat-activated. When mixed with a plastic material under controlled conditions these blowing agents produce bubbles. If a blowing agent is evenly distributed throughout the plastic material the bubbles are generally trapped evenly throughout the plastic article as the article cures. These trapped bubbles form a cellular structure within the finished article.

While it is often desirable to have a cellular structure within a plastic article, this cellular structure is typically undesirable on the outer shell of a finished plastic article. Bubbles forming near the outer shell of a curing plastic article often result in unaesthetic holes appearing on the surface of the article. Such surface bubbles may also compromise the integrity of the surface by creating sink holes or weak points where the article is unable to sustain pressure.

As described in co-pending U.S. patent application Ser. No. 08/082,266, now U.S. Pat. No. 5,437,823 it is desirable to mold a plastic part with a uniform cellular structure on the interior, which allows the part to be molded lighter and with less material, while at the same time having a denser outer skin, which increases the aesthetic and structural aspects of the finished article. To mold a plastic article without surface defects, the co-pending application describes a process whereby a two-section mold unit is filled with a plastic injection material having a blowing agent incorporated therein. As the injection material contacts the cool sides of the mold unit, the blowing agent is deactivated and the material near the sides of the mold cavity hardens into a smooth exterior. The warm interior of the material, however, has a cellular structure caused by the heat activation of the blowing agent within the injection mixture.

Because an article produced by the above process produces a lightweight article with a smooth aesthetic exterior appearance, it would be desirable to produce large containers and other objects which could benefit from the weight decrease of the interior cellular structure. Given that this process requires that the mold units move in relationship to one another during the molding process, the process is very well suited for producing flat sheets of material. While it is possible to produce more complex shapes with the above process, the mold units for producing such articles would necessarily be larger and more complicated owing to the requirements of moving the mold sections in relationship to one another during the molding process.

Another difficulty associated with molding a plastic article with a rare cellular interior and a smooth plastic exterior is the difficulty in maintaining an exterior skin of a constant thickness around corners in the mold cavity. Typically, in a molding process, the increased cooling effect of the mold cavity at places where two sides of the mold cavity meet leads to a thicker skin being formed at that point. This added thickness not only increases the amount of material which must be added to the mold cavity, thereby increasing costs, but the increased thickness also adds additional weight to the finished plastic article. Additionally, because the necessity of moving the mold sections in relationship to one another, and due to the limitations of mold cavity shape in plastic injection processes, it has not been possible to mold certain shapes with a cellular interior and smooth exterior. It would therefore be desirable to mold a flat sheet which could then be transformed after molding into a more complex shape.

The difficulties encountered in the prior art discussed hereinabove are substantially eliminated by the present invention.

SUMMARY OF THE INVENTION

Accordingly, it is an object of the present invention to provide a method for producing a reduced density angled plastic article without voids on or near the surface of the article.

Another object of the present invention is to provide a repeatable method for producing an angled plastic article with a dense outer skin and a rare uniform interior.

Still another object of the present invention is to provide an apparatus for reproducibly forming an angled plastic article with a dense outer skin and a rare uniform interior.

Yet another object of the present invention is to provide a method for forming an angled plastic article from a flat sheet.

Another object of the present invention is to provide a method for forming an angled plastic article having a cellular interior and a smooth exterior wherein the thickness of the smooth exterior remains substantially constant across the angled portion of the plastic article.

These and other objects of the invention will become apparent upon reference to the following specification, drawings, and claims.

By the present invention, it is proposed to overcome the difficulties encountered heretofore. To this end, a method of forming an angled plastic article having a cellular interior and a smooth exterior is provided whereby a plastic injection molded article is provided with an outer deformable plastic skin. First and second plastic cellular sections are molded integral with the outer deformable plastic skin a sufficient distance from one another to allow the plastic article to be bent between the two plastic cellular sections along the outer deformable plastic skin. The plastic article is angled along the outer deformable plastic skin between the two plastic cellular sections and modified to maintain the plastic article in this orientation.

Preferably, the plastic article is molded as a one-piece article with each plastic cellular section having: (1) a cellular interior contiguous with the outer deformable plastic skin; (2) a first side covered with an outer skin; and (3) a second side extending away from the outer deformable skin at an acute angle relative to the outer deformable skin. Before the plastic article is angled, the second side of the first plastic cellular section is treated with heat or an adhesive to attach to the second side of the second plastic cellular section. Accordingly, when the plastic article is angled, and the second sides of the first and second plastic cellular sections adhered to one another, an angled plastic article having a smooth outer skin and a cellular interior is formed from a readily molded flat sheet.

The flat sheet is preferably molded with a specially designed mold unit. In this mold unit, one of the mold sections is provided with a beveled core which is extensible relative to the mold section to which it is attached. During the molding process, as the two mold sections are moved in relationship to one another to form the cellular structure of the plastic article, the beveled core is extended and retracted to maintain the beveled portion of the core a constant distance from the opposing mold section throughout the molding process. This extensible/retractable beveled core allows a flat plastic article having a smooth exterior skin and a cellular interior to be molded with a groove which separates the plastic cellular sections and along which the finished plastic article may be angled. When hot melt welding or adhesive is applied to the groove and the article is angled along the groove, the article is maintained in the angled orientation. The angling produces a complex article having a cellular interior and smooth exterior.

DETAILED DESCRIPTION OF THE INVENTION

Figure 1:
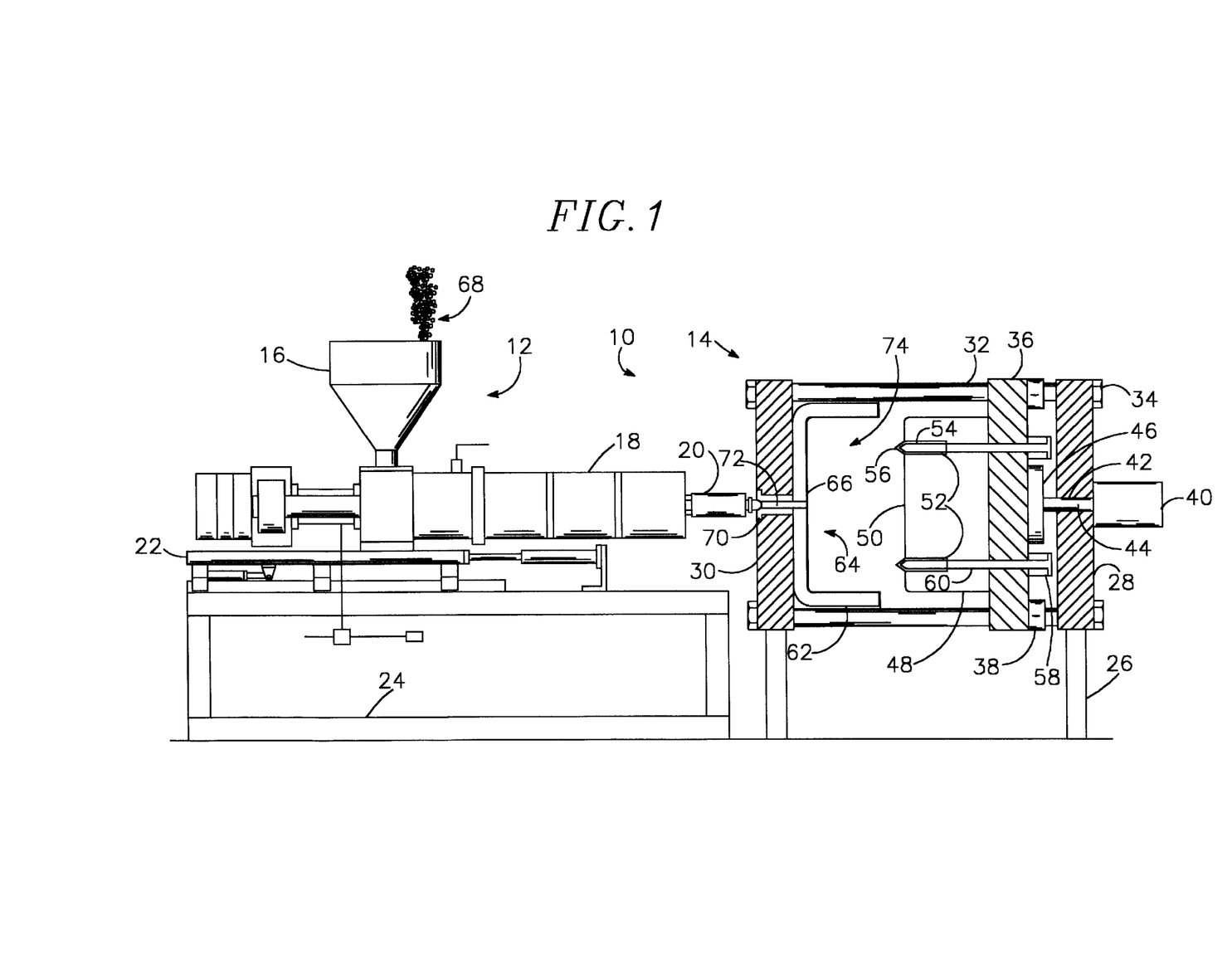
FIG. 1 is a side elevation in partial cross-section showing the plastic injection molding machine of the present invention in the open position.
Figure 2:
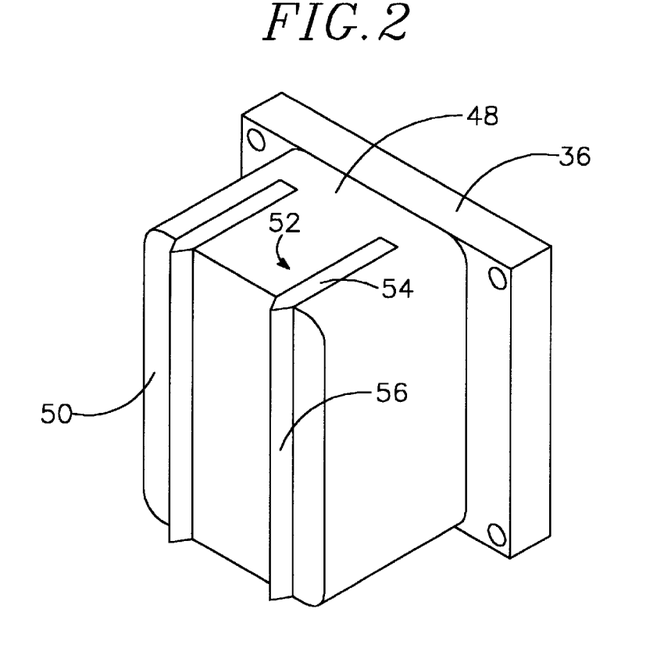
FIG. 2 is a perspective view of the movable mold section of FIG. 1 with the beveled core retracted.
Figure 3:
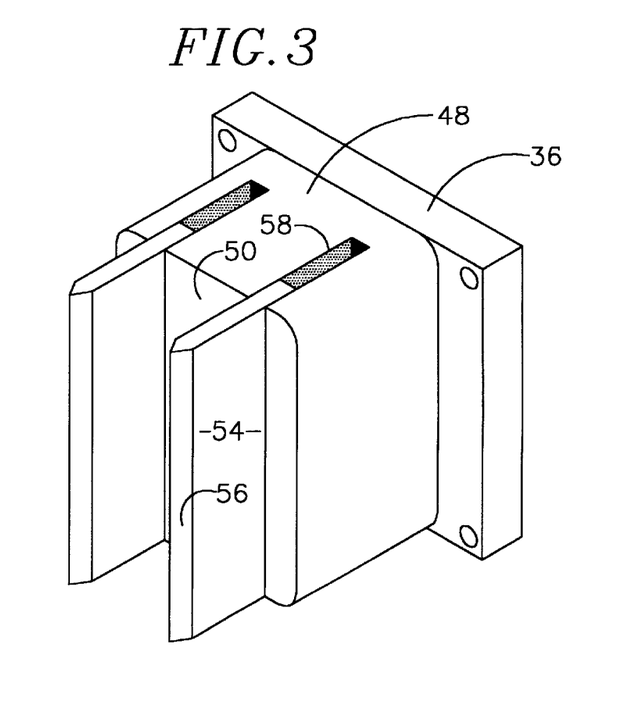
FIG. 3 is a perspective view of the movable mold section of FIG. 1 with the beveled core extended.
Figure 7:
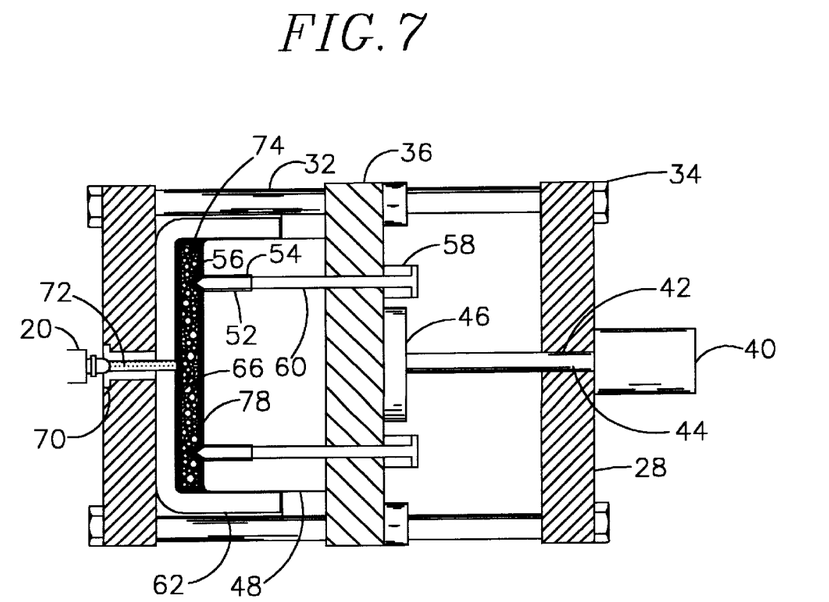
FIG. 7 is a side elevation in partial cross-section showing the mold unit of FIG. 1 in its final position with the beveled core retracted and a resultant plastic article formed therein.

In the Figures, a mold apparatus 10 is shown which includes an injection assembly 12 and a molding assembly 14 (FIG. 1). The molding assembly 14 includes a movable mold section 48 and a stationary mold section 62 which when clamped into sealed engagement with one another form a mold cavity 74 (FIG. 4) for the molding of a plastic article 78 (FIG. 7). The movable mold section 48 includes a pair of extensible and retractable beveled cores 52 (FIGS. 2 and 3).

Figure 5:
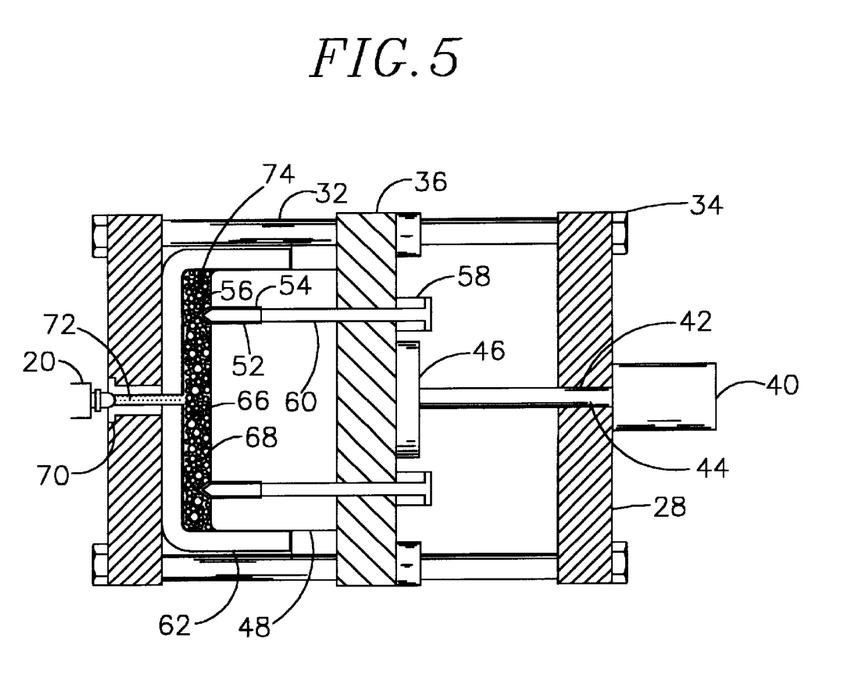
FIG. 5 is a side elevation in partial cross-section showing the mold unit of FIG. 1 closed in its initial position with the beveled core retracted and a plastic material injected into the mold cavity.
Figure 6:
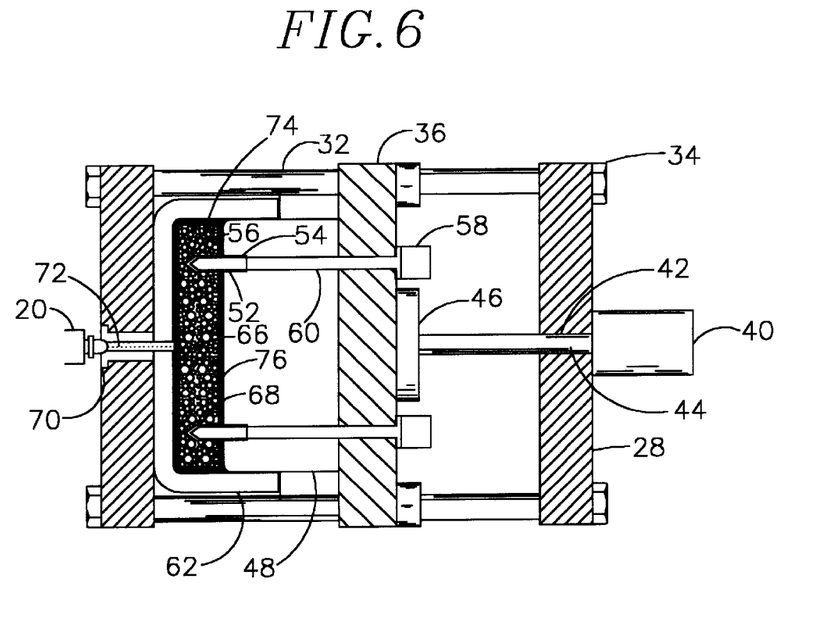
FIG. 6 is a side elevation in partial cross-section showing the mold unit of FIG. 1 in its intermediate position with the beveled core extended and the plastic material expanded to fill the mold cavity.

A plastic injection material 68 is provided with a blowing agent and injected into the mold cavity 74 where the blowing agent begins to produce bubbles and expand the injection material 68 (FIG. 5). Due to the cooling effect of the mold sections 48 and 62, the plastic injection material 68 in contact with mold sections 48 and 62 and beveled cores 52 does not expand. The cooling deactivates the blowing agent around the exterior of the plastic injection material 68, thereby preventing the formation of bubbles in the cooled portion of the plastic injection material 68. After a bubble-less skin 76 has formed along the edges of the mold cavity 74, the mold sections 48 and 62 are moved apart slightly to allow interior bubbles formed by the blowing agent to expand (FIG. 6). As the mold sections 48 and 62 are moved apart, the beveled cores 52 are extended to maintain a constant distance between the beveled cores 52 and the stationary mold section 62. After sufficient expansion of the bubbles has occurred, the mold sections 48 and 62 are moved toward one another, with the beveled cores 52 being retracted to maintain the predetermined distance between the beveled cores 52 and the stationary mold section 62 (FIG. 7). This compression step forces the bubbles into a uniform cellular structure.

Figure 8:
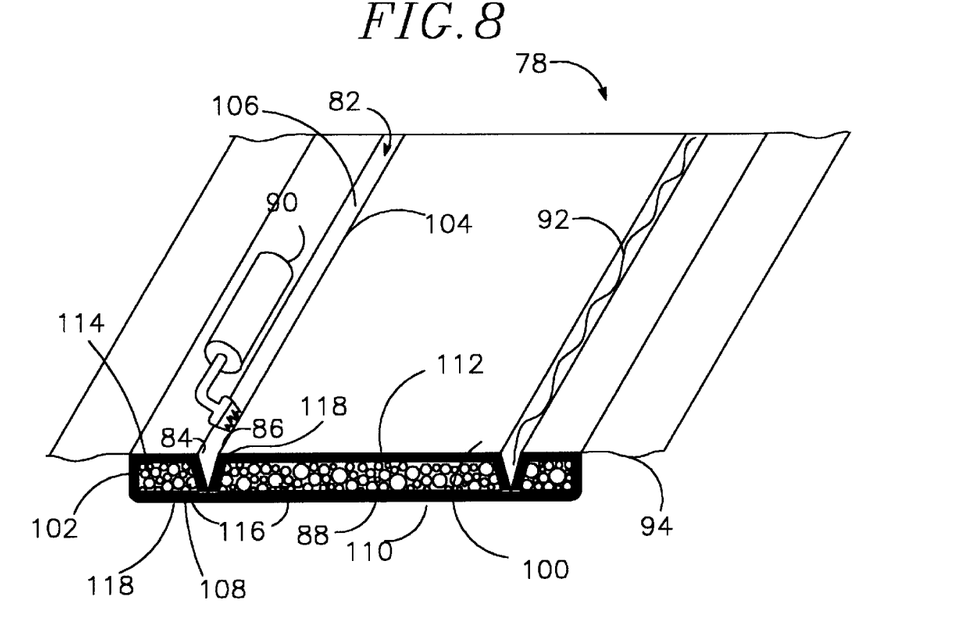
FIG. 8 is a perspective view in partial cross-section showing the plastic article of FIG. 7 with the resultant grooves therein.
Figure 9:
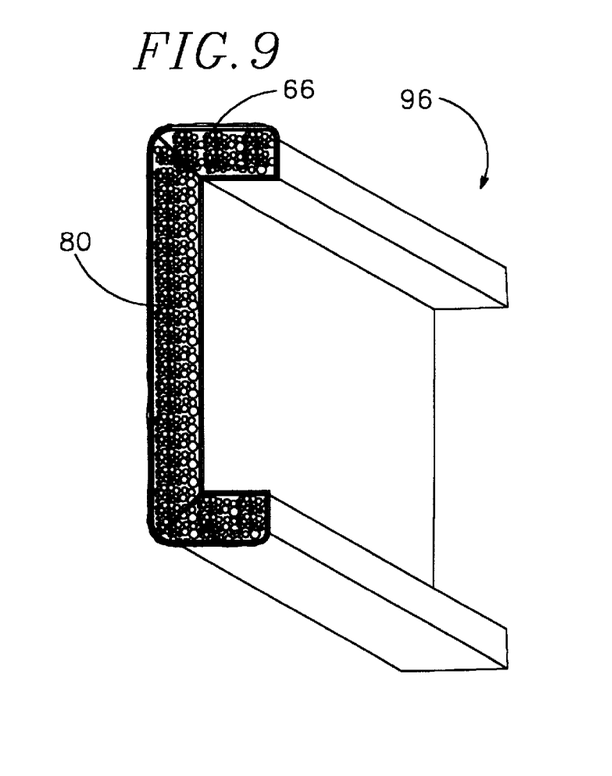
FIG. 9 is a perspective view showing the plastic article of FIG. 7 maintained in an angled orientation.

After the injection material 68 has sufficiently hardened, the movable mold section 48 is moved away from the stationery mold section 62 back to the initial positions shown in FIG. 1 and the molded plastic article 78 is removed from the mold cavity 74. The resulting molded plastic article 78 is formed with a pair of grooves 82 running the length of the plastic article 78 (FIG. 8). To form the finished article 96 of the present invention, a propane torch 90 is passed along the grooves 82 and the molded plastic article 78 is angled to bring sides 84 and 86 of the grooves 82 together until the heated sides 84 and 86 of the grooves 82 have hardened. Alternatively, a hot plate (not shown) can be used. In this way, an angled plastic article may be formed from a flat molded sheet (FIG. 9). While sides 84 and 86 are only shown on one of the grooves 82, it is to be understood that the same would apply to both of the grooves 82.

As shown in FIG. 1, the injection assembly includes a materials hopper 16, an injection barrel 18, and an injection nozzle 20 provided on a movable carriage 22. The movable carriage 22 is positioned on a stationary frame 24 which allows the injection assembly 12 to move into and out of contact with the molding assembly 14.

The molding assembly 14 is provided with a frame 26 on which rests a headplate 28 and a footplate 30 (FIG. 1). Four support rods 32, only two of which are shown in FIG. 1, and bolts 34 secure the headplate 28 and footplate 30 to one another. Slidably connected to the support rods 28 is a slidable carriage 36. Support blocks 38 are mounted to the corners of the carriage 36 to add extra support to the carriage 36 as it slides along the support bars 28.

A hydraulic cylinder 40 is secured to the headplate 28 over a bore 42 passing through the headplate 28 (FIG. 1). Slidably positioned within the bore 42 is a ram 44 which is secured on one end to the hydraulic cylinder 40 and on the opposite end to a platen 46. The platen 46 is secured to the slidable carriage 36 to evenly distribute the force of the ram 44 across the slidable carriage 36.

Secured to the slidable carriage 36 on the side opposite the platen 46 is the movable mold section 48 provided with a molding surface 50 and the two beveled cores 52 (FIGS. 1 and 3). As the beveled cores 52 are substantially identical, the description will be limited to a single beveled core 52. As shown in FIG. 3, the beveled core 52 is provided with a body 54 extending substantially the entire length of the molding surface 50 and with a beveled surface 56 which also extends substantially the entire length of the molding surface 50. The movable mold section 48 is provided with a slot 58 cut across the length of the molding surface 50 having a width substantially equal to the width of the body 54 of the beveled core 52 and a depth equal to approximately one-half the depth of the movable mold section 48. It should be noted that the beveled core 52 and slot 58 may be provided with various dimensions to accommodate various molding requirements.

As shown in FIG. 1, a hydraulic cylinder 58 is provided with a ram 60 which extends through the slidable carriage 36 and movable mold section 48 to connect with the beveled core 52. Accordingly, as the hydraulic cylinder 58 is actuated, the ram 60 extends and retracts the beveled core 52 relative to the movable mold section 48. Secured to the footplate 30 opposite to and in mating alignment with the movable mold section 48 is a stationary mold section 62 having a recess 64. Preferably, a lamina 66 such as cloth, carpet, or a flexible wood veneer is placed within the recess 64 against the stationary mold section 62. The footplate 30 is provided with a sprue 70 and the stationary mold section 62 is provided with a runner 72 to allow the plastic injection material 68 to pass from the injection assembly 12 into the molding assembly 14.

A plastic injection material 68 is prepared by adding a blowing agent to a plastic material. Although several blowing agents are known in the art, in the preferred embodiment the blowing agent is bicarbonate of soda. Bicarbonate of soda decomposes when heated to produce a gas consisting of mainly nitrogen and carbon monoxide. In the preferred embodiment of the present invention, thirty percent by weight of bicarbonate of soda is added to polyurethane to produce the plastic injection material 68.

Before the injection material 68 is injected into the mold cavity 74, it is first plasticized to provide a flowable material which eventually hardens into the finished plastic article 78. The following parameters affect the plasticization process: the type of raw plastic material to be plasticized; throat temperature; the temperature of injector heating zones; the size, length and type of screw; the rate at which the screw is turned; and the rate at which the screw is allowed to move back. Of these parameters, only the type of raw plastic material and screw dimensions are not directly controlled by software within a central processing unit (CPU) such as a personal computer. The throat temperature and temperature of injector heating zones are controlled by standard proportion integral derivative (PID) control algorithms. The software controls the rate at which the screw is turned so that the rate is directly proportional to the rate of oil produced by a variable vane hydraulic pump. The software directly controls the rate at which the oil is delivered by the variable vane pump by supplying two set points, a rate set point and a maximum pressure set point. The rate set point specifies the rate of oil flow requested while the maximum pressure set point specifies a maximum pressure limit. Consequently, since pressure is a function of rate of flow times a resistance, the maximum pressure set point will limit the rate of flow in the case when maximum pressure is obtained. Preferably, the rate at which the screw turns during the plasticization process is profiled. Profiling causes the screw to turn at different rates during the plasticized cycle. Software is written to specify the particular profile by supplying the required rate and the maximum pressure set points to the variable vane pump supplying a profile to flow of oil to the screw.

The rate at which the screw is allowed to move back is also controlled by software. The profiled turning of the screw during the plasticization process causes the plastic material to be metered to an area in front of the screw. The plastic material being metered forward causes a counter plastic pressure attempting to force the screw backward. The rate at which the screw moves backward, from the counter pressure of the plastic material being metered forward, is profiled by software. Profiling of the rate of movement backward allows for variations in the amount of time the plastic material is mixed by the screw, as well as profiling the amount of frictional heat created by the screw turning which in turn is induced into the plastic material. Software specifies this profile by supplying a back pressure set point to a variable hydraulic back pressure valve.

Like the plasticization process, the injection process is also controlled by software. The parameters associated with the injection process include the following: the type of raw plastic material to be injected; the temperature of the plastic material; the size, length and type of screw; the rate at which the plastic material is injected; the mold design; and the mold temperature. Preferably, both the temperature of the material and the rate at which the plastic material is injected are controlled by software. To control the temperature of material as the material enters the mold cavity 74 during injection, software controls several parameters. The heater bin temperature is manipulated during the plasticization process and frictional heat is controlled during both the plasticization and back pressure cycles. Additionally, frictional heat developed from the plastic material moving through the injection nozzle during the injection process is controlled to provide the optimum amount of heat into the material based upon the desired resulting plastic product.

Software allows the rate at which the plastic material is injected during the inject cycle to be profiled. Profiling causes the material to be injected at different rates during the inject cycle. Software specifies this profile by supplying the required rate and maximum pressure set points to the variable vane pump supplying a profile to flow of oil to the cylinders attached to the screw. A typical inject profile will begin at a slow inject rate with the pump set to allow for maximum pressure. As the mold cavity 74 fills, the rate proportionally increases to the optimum rate for the filling of the mold cavity 74. When the mold cavity 74 is approximately ninety percent (90%) filled, the maximum pressure set point of the hydraulic pump is lowered to a value which prevents the injection pressure from overcoming the clamp pressure. The remainder of the material is injected into the mold cavity 74 allowing the pressure compensation characteristics of the pump to control the rate at which the material is injected. This type of profiling describes a manner in which the tool is approximately ninety percent (90%) filled using rate control with the last ten percent (10%) using pressure control. This is accomplished by the design of the hydraulic system and control software.

Figure 4:
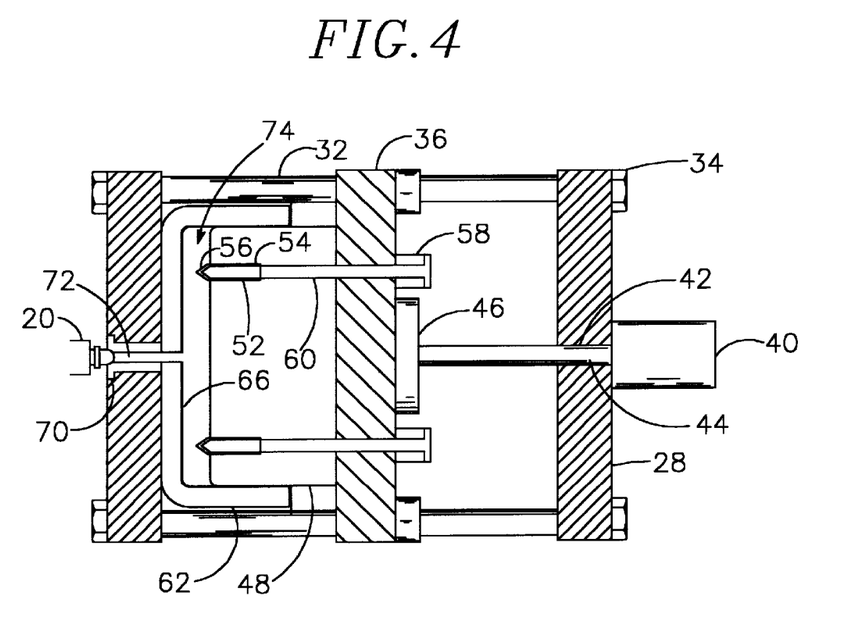
FIG. 4 is a side elevation in partial cross-section showing the mold unit of FIG. 1 closed in its initial position and the beveled core retracted.

To begin the molding process, the plastic injection material 68 is placed within the materials hopper 16 of the injection assembly 12. As the plastic injection material 68 is heated and plasticized within the injection assembly 12, the hydraulic cylinder 40 is actuated to move the slidable carriage 36 and movable mold section 48 into sealed engagement with the stationary mold section 62. As shown in FIG. 4, when the movable mold section 48 and stationary mold section 62 are in an initial molding orientation, a mold cavity 74 is formed between the mold sections. In this initial orientation, the beveled edge 56 of the beveled core 52 is positioned approximately 1.5 millimeters from the lamina 66 provided along the stationary mold section 62. While the distance of the beveled edge 56 from the lamina 66 may be varied according to the desired characteristics of the finished plastic article, the distance is preferably equal to the thickness of the skin which will surround the finished plastic article.

After the movable mold section 48 has been moved into the initial orientation relative to the stationary mold section 62 to form the mold cavity 74 of an initial volume, the plastic injection material 68 is moved from the injection barrel 18 through the nozzle 20, the sprue 70, and the runner 72 into the mold cavity 74 (FIGS. 1 and 5). As the plastic injection material 68 enters the mold cavity, the plastic injection material 68 moves under the beveled edge 56 of the beveled core 52 to completely fill the mold cavity 74 as shown in FIG. 5.

As the plastic injection material 68 enters the mold cavity 74, the coolness of the movable mold section 48 and stationary mold section 62 prevent the blowing agent contained within the portion of the plastic injection material 68 contacting the movable mold section 48 and the lamina 66 from activating to produce gas bubbles (FIG. 5). This unactivated portion of the plastic injection material 68 forms a skin 76 which surrounds the plastic injection material 68 (FIG. 6). Once the skin 76 has formed, the hydraulic cylinder 40 is actuated to move the slidable carriage 76 and movable mold section 48 away from the stationary mold section 62 as shown in FIG. 6. As the movable mold section 48 is moved away from the stationary mold section 62, the hydraulic cylinder 58 is actuated to extend the ram 60 and beveled core 52 enough to maintain the distance between the lamina 66 and the beveled edge 56 of the beveled core 52.

As the size of the mold cavity 74 is increased, the blowing agent within the plastic injection material 68 creates expanding gas bubbles which are distributed throughout the plastic injection material 68. Once a sufficient number of gas bubbles have formed to produce the density desired in a molded plastic article 78, the hydraulic cylinder 40 is actuated to move the slidable carriage 36 and movable mold section 48 toward the stationary mold section 62 to form a mold cavity 74 having a final volume less than the aforementioned intermediate volume. Preferably, the final volume equals the initial volume, but may of course be any suitable volume. During this compression stage, the hydraulic cylinder 58 is actuated to move the ram 60 to draw the beveled core 52 into the slot 58 of the movable mold section 48 to maintain the distance between the beveled edge 56 and the laminate 66. This compression stage distributes the air bubbles formed by the blowing agent evenly across the molded plastic article 78 and allows the molded plastic article 78 to harden to its finished form.

As shown in FIGS. 8 and 9, the molded plastic article 78 is provided with a lightweight cellular interior 80 surrounded by the smooth exterior skin 76. The molded plastic article 78 is also provided with two grooves 82, each having a first wall 84 and a second wall 86. In the preferred embodiment of the present invention, groove 82 is deep enough so that there is no cellular material 80 between the skin surrounding the groove 82 and the skin surrounding a back portion 88 of the molded plastic article 78. Due to the absence of intervening cellular material 80 and the flexibility of the skin 76, the molded plastic article 78 is capable of being angled along the groove 82. In this manner, the groove 82 divides the molded plastic article 78 into two sections (see FIG. 8). Specifically, on one side of the groove 82 lies a first inner plastic cellular section 100, and on the other side of the groove lies a second inner plastic cellular section 102. Each of the inner plastic cellular sections 100, 102 consists of a lightweight cellular interior 80, and an outer deformable skin 76 that surrounds the cellular interior 80 (see FIGS. 8–9). Additionally, since the groove 82 forms the boundary between the first and second inner plastic cellular sections 100, 102, the first wall 84 forms a first side 104 of the first inner plastic cellular section 100, and the second wall 86 forms a first side 106 of second inner plastic cellular section 102 (see FIG. 8). Further, because the outer skin 76 forms everywhere along the perimeter of the molded article 78, the outer skin covers the first sides 104, 106 of each of the inner plastic cellular sections 100, 102. The first sides 104, 106 of each of the inner plastic cellular sections 100, 102 lie between a second side 108, 110 and a third side 112, 114. The first sides 104, 106 of each of the inner plastic cellular sections 100, 102 are angled such that an acute angle 116 is formed between the first sides 104, 106 and the second sides 108, 110 of each of the inner plastic cellular sections 100, 102. An obtuse angle 118 is formed between the first sides 104, 106 and the third sides 112, 114 of each of the inner plastic cellular sections 100, 102 (See FIG. 8). To form a finished plastic article 96, the skin 76 within the groove 82 is heated with a propane torch 90 or similar heating element to allow the first side 84 of the groove 82 to adhere to the second side of the groove 86 when the molded plastic article 78 is angled as shown in FIG. 9. Since the outer skin 76 actually covers the first wall 84 of the groove 82 and the second wall 86 of the groove 82, the outer skin 76 adheres to itself. An alternative method of maintaining the angled orientation of the molded plastic article 78 is to apply an adhesive material 92 such as an epoxy or similar adhesive to the second side 86 of the groove 82 before angling the molded plastic article 78 as shown in FIG. 9. After the grooves 82 have been properly treated and waste laminating (not shown) has been removed from the molded plastic article 78, the adhesion means used to adhere the first side 84 of the groove 82 to the second side 86 of the groove 82 is allowed to harden to provide the finished plastic article 96 shown in FIG. 9.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is anticipated to be within the scope of the invention to eliminate the density reduction phase and to merely compress the reaction material after a sufficient number of gas bubbles have been formed to provide the desired density of the plastic article. Additionally, it is anticipated that any number and orientation of grooves may be provided in the molded plastic article to produce finished plastic articles of various dimensions. Furthermore, the maximum pressure set point of the hydraulic pump is lowered to a valve which prevents the injection pressure from overcoming the clamp pressure can be done when the mold cavity 74 is less than the preferred ninety percent (90%) filled. Also, other blowing agents such as azodicarbonamide can be used rather than the preferred bicarbonate of soda.

What is claimed is:

1. An angled plastic article having a smooth exterior and a cellular interior, the article comprising:
   a first inner plastic cellular section;
   a second inner plastic cellular section;
   an outer skin molded integral with said first and second inner plastic cellular sections to
      form a single unified plastic article, said outer skin having a first part and a second
      part, said outer skin having a smooth exterior, said outer skin being denser than
      said inner plastic cellular sections, said outer skin first part at least partially
      enclosing said inner plastic cellular section, said outer skin second part at least
      partially enclosing said second inner plastic cellular section; and
   means for adhering said outer skin first part to said outer skin second part such that said
      first inner plastic cellular section is maintained at an angle relative to said second
      inner plastic cellular section.

2. The angled plastic article according to claim 1, wherein said means for adhering is said outer skin which has been melted and rehardened.

3. The angled plastic article according to claim 1, wherein said means for adhering is a sufficient quantity of adhesive to allow said outer skin first part to adhere to said outer skin second part.

4. The angled plastic article according to claim 1, further comprising a deformable lamina molded integral with said outer skin.

5. A flat plastic article having smooth exterior and a cellular interior that is suitable to be folded into an angled plastic article, the flat plastic article comprising:
   a first inner plastic cellular section;
   a second inner plastic cellular section; and
   an outer skin molded integral with said first and second inner plastic cellular sections to
      form a single unified plastic article, said outer skin having a smooth exterior, said
      outer skin having a first part and a second part, said outer skin being denser than
      said inner plastic cellular sections, said outer skin first part at least partially
      enclosing said first inner plastic cellular section, said outer skin first and second
      parts each having a groove forming surface, said groove forming surfaces
      intersecting with each other at an angle to form a groove such that said groove
      forming surfaces may be folded across said groove into contact with each other to
      form the angled plastic article.

6. The flat plastic article of claim 5, further comprising a deformable fabric lamina molded integral with said outer skin.

* * * * *